US011009087B2

(12) United States Patent
Kitai

(10) Patent No.: US 11,009,087 B2
(45) Date of Patent: May 18, 2021

(54) CLUTCH CONNECTING/DISCONNECTING DEVICE

(71) Applicant: TOYOTA JIDOSHA KABUSHIKI KAISHA, Toyota (JP)

(72) Inventor: Shinya Kitai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 16/509,575

(22) Filed: Jul. 12, 2019

(65) Prior Publication Data

US 2020/0018364 A1    Jan. 16, 2020

(30) Foreign Application Priority Data

Jul. 12, 2018   (JP) .............................. JP2018-132727

(51) Int. Cl.
*F16D 48/02*   (2006.01)
*F16D 29/00*   (2006.01)

(52) U.S. Cl.
CPC ........... *F16D 48/02* (2013.01); *F16D 29/005* (2013.01); *F16D 2048/023* (2013.01); *F16D 2048/0212* (2013.01); *F16D 2048/0224* (2013.01); *F16D 2048/0254* (2013.01); *F16D 2500/1024* (2013.01)

(58) Field of Classification Search
CPC ............. F16D 48/02; F16D 2048/0212; F16D 2048/0221; F16D 2048/0224; F16D 2048/023; F16D 2048/2048; F16D 2048/0254; F16D 48/06; F16D 48/066; F16D 25/087; F16D 25/14; F16D 29/005; F16D 2500/1024
See application file for complete search history.

(56) References Cited

U.S. PATENT DOCUMENTS

| 6,607,060 B2* | 8/2003 | Inoue .................... F16D 25/088 |
| | | 192/83 |
| 2013/0138313 A1* | 5/2013 | Iwao ..................... B60W 10/02 |
| | | 701/67 |
| 2018/0281591 A1* | 10/2018 | Morgan ................. B60K 6/387 |

FOREIGN PATENT DOCUMENTS

| EP | 3312447 A2 | 4/2018 |
| JP | 2000220661 A * | 8/2000 |
| JP | 2012-112499 A | 6/2012 |
| JP | 2017-509848 A | 4/2017 |
| JP | 2018-066417 A | 4/2018 |

* cited by examiner

*Primary Examiner* — Richard M Lorence
(74) *Attorney, Agent, or Firm* — Oliff PLC

(57) ABSTRACT

A clutch connecting/disconnecting device comprises: a clutch pedal; a clutch cylinder; a depression force transmission mechanism; and an actuator. The depression force transmission mechanism is configured to include a cylinder device. The cylinder device includes an input piston, an output piston, a first oil chamber, and a second oil chamber. A pressure receiving area on the first oil chamber side of the output piston is made equal to a pressure receiving area on the second oil chamber side of the output piston. The first oil chamber and the second oil chamber are connected via an electromagnetic valve connecting and disconnecting between the first oil chamber and the second oil chamber, and the actuator is connected to the output piston in a power transmitting manner.

8 Claims, 5 Drawing Sheets

CLUTCH CONNECTING/DISCONNECTING DEVICE

This application claims priority from Japanese Patent Application No. 2018-132727 filed on Jul. 12, 2018, the disclosure of which is herein incorporated by reference in its entirety.

FIELD OF THE INVENTION

The present invention relates to a clutch connecting/disconnecting device having a clutch-by-wire system.

DESCRIPTION OF THE RELATED ART

There is proposed a clutch connecting/disconnecting device having a clutch-by-wire system which controls an actuator to connect/disconnect a clutch based on an operation amount of a clutch pedal to connect/disconnect a clutch. For example, this corresponds to a clutch control device described in Patent Document 1. Such a clutch connecting/disconnecting device having the clutch-by-wire system is advantageous in that, for example, an actuator can be controlled during coasting running for running with the clutch disconnected.

PRIOR ART DOCUMENTS

Patent Documents

Patent Document 1: Japanese Laid-Open Patent Publication No. 2012-112499
Patent Document 2: Japanese Unexamined Patent Application Publication (Translation of PCI Application) No. 2017-509848

SUMMARY OF THE INVENTION

Technical Problem

Since a clutch pedal and a clutch are not mechanically connected in a clutch-by-wire system, the clutch may suddenly be engaged when the system fails, for example. For a fail-safe against this situation, for example, it is proposed to prevent a sudden engagement of the clutch by disposing a self-lock mechanism and actuating the self-lock mechanism when a system failure occurs. However, this has a problem that once the self-lock mechanism is actuated, it is difficult to run thereafter.

The present invention was conceived in view of the situations and it is therefore an object of the present invention to provide a structure of a clutch connecting/disconnecting device having a clutch-by-wire system configured to prevent a sudden engagement of the clutch when a system failure occurs and enable subsequent running.

Solution to Problem

A first aspect of the present invention provides a clutch connecting/disconnecting device comprising: (a) a clutch pedal operated by a driver; a clutch cylinder to which a depression force from the clutch pedal is transmitted; a depression force transmission mechanism transmitting the depression force from the clutch pedal to the clutch cylinder; and an actuator connected to the depression force transmission mechanism in a power transmitting manner and connecting and disconnecting a clutch via the depression force transmission mechanism, wherein (b) the depression force transmission mechanism is configured to include a cylinder device to which the depression force from the clutch pedal is transmitted, wherein (c) the cylinder device includes (d) an input piston to which the depression force from the clutch pedal is input, (e) an output piston for outputting a clutch operating hydraulic pressure to the clutch cylinder, (f) a first oil chamber formed between the input piston and the output piston, and (g) a second oil chamber supplied with a hydraulic oil for pressing the output piston with a hydraulic pressure of the hydraulic oil in a connecting direction of the clutch, wherein (h) a pressure receiving area on the first oil chamber side of the output piston is made equal to a pressure receiving area on the second oil chamber side of the output piston, wherein (i) the first oil chamber and the second oil chamber are connected via an electromagnetic valve connecting and disconnecting between the first oil chamber and the second oil chamber, and wherein (j) the actuator is connected to the output piston in a power transmitting manner.

A second aspect of the present invention provides the clutch connecting/disconnecting device recited in the first aspect of the invention, wherein the electromagnetic valve is closed when an abnormality occurs in at least one of an electronic control device controlling the connecting/disconnecting device and the connecting/disconnecting device.

A third aspect of the present invention provides the clutch connecting/disconnecting device recited in the first or second aspect of the invention, wherein the electromagnetic valve is closed when the output piston is moved to a disconnecting position of the clutch by the actuator.

A fourth aspect of the present invention provides the clutch connecting/disconnecting device recited in any one of the first to third aspects of the invention, wherein a pedal effort simulator is connected to a connecting pipe connecting the second oil chamber and the electromagnetic valve.

A fifth aspect of the present invention provides the clutch connecting/disconnecting device recited in the fourth aspect of the invention, wherein the connecting pipe is connected via a second electromagnetic valve to a reservoir tank.

A sixth aspect of the present invention provides the clutch connecting/disconnecting device recited in any one of the first to fifth aspects of the invention, wherein (a) the actuator is configured to include an electric motor, a screw transmission device converting a rotational motion of the electric motor into a linear motion, a hydraulic cylinder driven by the screw transmission device, and a control oil chamber formed at a position adjacent to the output piston and supplied with a hydraulic oil for pressing the output piston in a disconnecting direction of the clutch, and wherein (b) the control oil chamber is formed to receive the hydraulic oil output from the hydraulic cylinder.

A seventh aspect of the present invention provides the clutch connecting/disconnecting device recited in any one of the first to fifth aspects of the invention, wherein (a) the actuator is configured to include an electric motor and a screw transmission device converting a rotational motion of the electric motor into a linear motion, and wherein (b) the screw transmission device is connected to the output piston in a power transmitting manner.

An eighth aspect of the present invention provides the clutch connecting/disconnecting device recited in the first aspect of the invention, wherein the electromagnetic valve is a normally closed type valve.

Advantageous Effects of Invention

According to the clutch connecting/disconnecting device recited in the first aspect of the invention, the connection/ disconnection state between the first oil chamber and the second oil chamber is switched by the electromagnetic valve to enable the by-wire control in which the actuator is operated in accordance with the operation amount of the clutch pedal to connect and disconnect the clutch, and if a system failure has occurred, the direct operation can be performed such that the depression force from the clutch pedal is directly transmitted to the output piston. For example, the by-wire control is provided while the electromagnetic valve is opened. In this case, although the first oil chamber and the second oil chamber are connected, the pressure receiving area on the first oil chamber side of the output piston is equal to the pressure receiving area on the second oil chamber side of the output piston, change amounts of the hydraulic oil in the first oil chamber and the second oil chamber are equal when the output piston moves, and the pressing force applied from the first oil chamber side of the output piston becomes equal to the pressure applied from the second oil chamber side of the output piston. Therefore, the pressing forces applied from each of the first and second oil chambers side of the output piston are offset each other, and it is not necessary to consider the pressing forces applied from the first oil chamber side and the second oil chamber side during the transition period of movement of the output piston.

According to the clutch connecting/disconnecting device recited in the second aspect of the invention, when an abnormality occurs in the at least one of the electronic control device and the connecting/disconnecting device, the electromagnetic valve is closed to seal the first oil chamber, and therefore, the output piston is retained by the hydraulic oil of the first oil chamber, so that the clutch is prevented from being suddenly engaged due to the occurrence of abnormality. Additionally, force can be transmitted via the hydraulic oil in the first oil chamber between the input piston and the output piston, and the clutch can directly be operated by depressing the clutch pedal.

According to the clutch connecting/disconnecting device recited in the third aspect of the invention, when the output piston is moved to the disconnecting position of the clutch by the actuator, the electromagnetic valve is closed, so the first oil chamber is sealed and the output piston is retained by the hydraulic oil in the first oil chamber. Therefore, it is not necessary to retain the output piston at the disconnecting position of the clutch by the actuator, and the actuator can be stopped.

According to the clutch connecting/disconnecting device recited in the fourth aspect of the invention, since the pedal effort simulator is connected to the connecting pipe connecting the second oil chamber and the electromagnetic valve, when the electromagnetic valve is opened, the pedal effort simulator is connected to the first oil chamber. In this case, a hydraulic pressure is generated in the pedal effort simulator by the hydraulic oil flowing into the pedal effort simulator from the first oil chamber due to the movement of the input piston, and this hydraulic pressure is transmitted to the input piston as a pedal reaction force of the clutch pedal. Therefore, the pedal reaction force during a transition period of depression of the clutch pedal can be generated in a simulated manner by the pedal effort simulator.

According to the clutch connecting/disconnecting device recited in the fifth aspect of the invention, since the connecting pipe is connected via the second electromagnetic valve to the reservoir tank, when the second electromagnetic valve is opened while the electromagnetic valve is closed, the pedal effort simulator is connected via the second electromagnetic valve to the reservoir tank. Therefore, the hydraulic pressure of the second oil chamber and the pedal effort simulator is released, so that the output piston is prevented from being pressed in the clutch connecting direction by the hydraulic pressure of the hydraulic oil of the second oil chamber during the transition period of movement of the output piston.

According to the clutch connecting/disconnecting device recited in the sixth aspect of the invention, when the hydraulic oil output from the hydraulic cylinder is supplied to the control oil chamber, the output piston can be moved in the clutch disconnecting direction in accordance with the operation amount of the clutch pedal during the transition period of depression of the clutch pedal, or the output piston can automatically be moved in the clutch disconnecting direction, by the hydraulic pressure of the hydraulic oil of the control oil chamber.

According to the clutch connecting/disconnecting device recited in the seventh aspect of the invention, since the rotational motion of the electric motor is converted into the linear motion by the screw transmission device, the output piston can be moved by the electric motor. Therefore, by controlling the electric motor, the output piston can be moved in the clutch disconnecting direction in accordance with the operation amount of the clutch pedal during the transition period of depression of the clutch pedal, or the output piston can automatically be moved in the clutch disconnecting direction.

According to the clutch connecting/disconnecting device recited in the eighth aspect of the invention, since the electromagnetic valve is the normally closed type valve, even when an abnormality occurs in which it is difficult to supply electric power to the control system controlling the connecting/disconnecting device, the electromagnetic valve is closed so that the first oil chamber is sealed, and the clutch can directly be operated by depressing the clutch pedal.

MODES FOR CARRYING OUT THE INVENTION

Examples of the present invention will now be described in detail with reference to the drawings. In the following examples, the figures are simplified or deformed as needed and portions are not necessarily precisely drawn in terms of dimension ratio, shape, etc.

First Example

Figure 1:
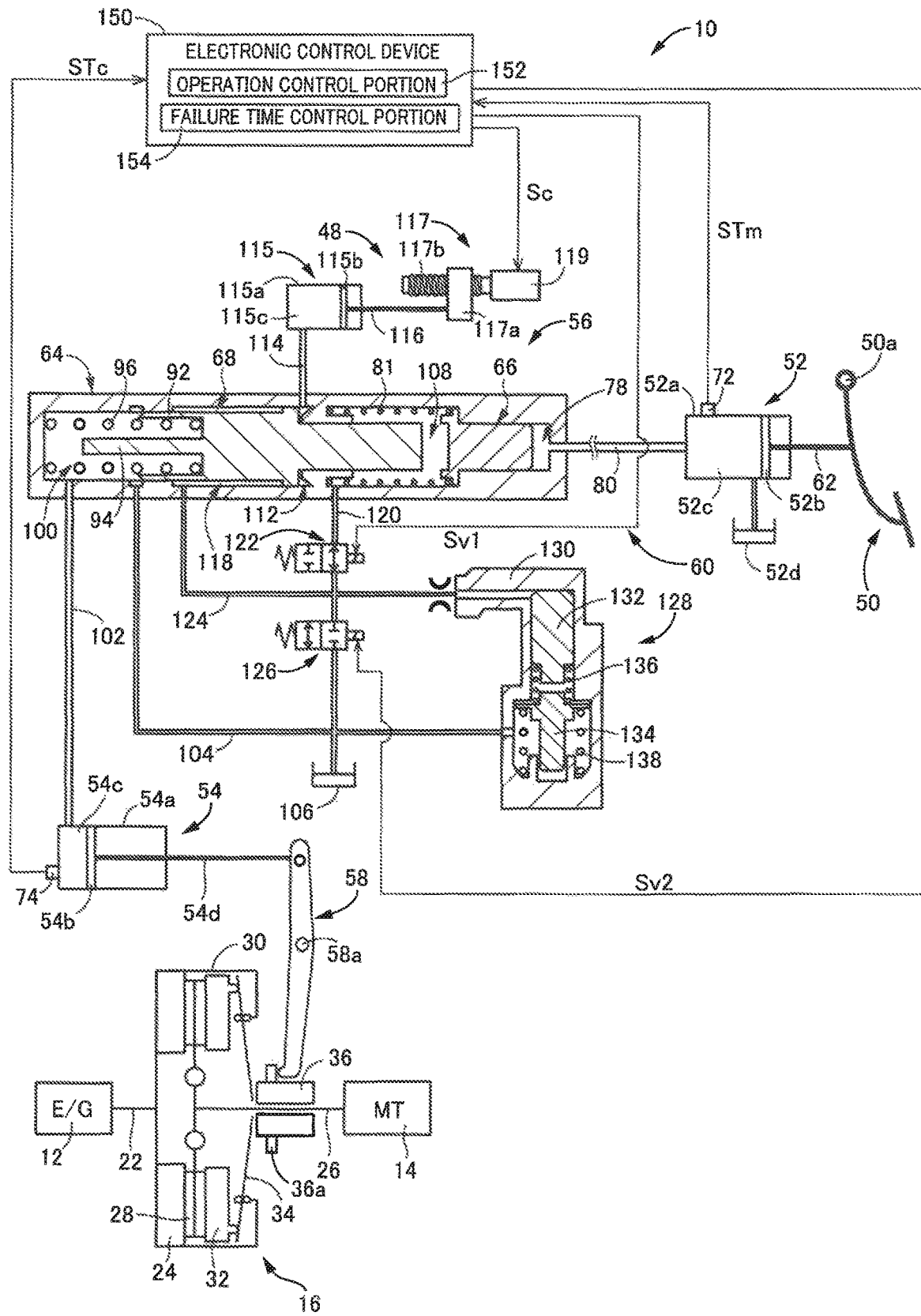
FIG. 1 shows an overall structure of a connecting/disconnecting device of a clutch according to the present invention and a system (control system) controlling the connecting/disconnecting device.

FIG. 1 shows an overall structure of a connecting/disconnecting device 10 of a clutch 16 and an electronic control device 150 controlling the connecting/disconnecting device 10 to which the present invention is applied. The connecting/disconnecting device 10 is a device connecting and disconnecting the clutch 16 disposed on a power transmission path between an engine 12 and a manual transmission 14.

The engine 12 is a drive force source generating a drive force for running of a vehicle and is an internal combustion engine such as a gasoline engine and a diesel engine generating the drive force by combustion of fuel injected in a cylinder, for example. The manual transmission 14 is disposed in a power transmission path between the engine 12 and drive wheels and is made up of a well-known parallel two axes transmission, for example.

The clutch 16 is brought into a connected state while a clutch pedal 50 is not depressed, and this results in a power transmission state in which the engine 12 and the manual transmission 14 are connected in a power transmittable manner. On the other hand, when the clutch pedal 50 is depressed, the clutch 16 is switched to a slip state or a disconnected state. If a condition for enabling coasting running is satisfied during running, the clutch 16 is automatically disconnected by an actuator 48 described later.

The clutch 16 is configured to include a flywheel 24 attached to an output shaft 22 of the engine 12, a clutch disc 28 attached to a transmission input shall 26 of the manual transmission 14, a clutch cover 30 connected to the flywheel 24, a pressure plate 32 housed in the clutch cover 30, a diaphragm spring 34 generating an urging force pressing the clutch disc 28 against the flywheel 24, and a release bearing 36 disposed on the outer circumferential side of the transmission input shaft 26 and relatively movable in an axial direction with respect to the transmission input shaft 26.

While the clutch 16 is connected, the pressure plate 32 and the clutch disc 28 are pressed against the flywheel 24 by the diaphragm spring 34. This brings the flywheel 24 and the clutch disc 28 into a close contact state. When the release bearing 36 is moved toward the engine 12 in the axial direction from the connected state of the clutch 16, and an inner circumferential portion of the diaphragm spring 34 is pressed by the release bearing 36, the diaphragm spring 34 is deformed, and the urging force pressing the clutch disc 28 against the flywheel 24 is reduced. This brings the clutch 16 into the slip state. When the release bearing 36 further moves to a predetermined clutch disconnecting position, the urging force of the diaphragm spring 34 pressing the clutch disc 28 against the flywheel 24 becomes zero, and the clutch disc 28 is separated from the flywheel 24. At this point, the clutch 16 is disconnected.

The connecting/disconnecting device 10 employs a so-called clutch-by-wire system in which the clutch 16 is connected and disconnected via the actuator 48 described later in response to a driver's depressing operation of the clutch pedal 50. The connecting/disconnecting device 10 is configured to include the clutch pedal 50 operated by the driver, a clutch master cylinder 52 (hereinafter referred to as a master cylinder 52) converting a depression force on the clutch pedal 50 (i.e., pedal effort) into a hydraulic pressure, a clutch release cylinder 54 (hereinafter referred to as a clutch cylinder 54) to which the depression force on the clutch pedal 50 is transmitted, a cylinder device 56 disposed between the master cylinder 52 and the clutch cylinder 54, a release fork 58 disposed between the clutch cylinder 54 and the release bearing 36 for moving the release bearing 36 in accordance with an operation amount of the clutch cylinder 54, the actuator 48 connected to an output piston 68 described later of the cylinder device 56 in a power transmittable manner and configured to operate the clutch cylinder 54 via the cylinder device 56, i.e., connect/disconnect the clutch 16, and a pedal effort simulator 128 generating a pedal reaction force corresponding to the depression force on the clutch pedal 50. The master cylinder 52 and the cylinder device 56 constitute a depression force transmission mechanism 60 transmitting the depression force on the clutch pedal 50 to the clutch cylinder 54.

The clutch pedal 50 is pivotable around a supporting portion 50a thereof when the clutch pedal 50 is depressed by the driver. The clutch pedal 50 and the master cylinder 52 are mechanically coupled via a coupling rod 62.

The master cylinder 52 is configured to include a cylindrical cylinder body 52a, a disc-shaped piston 52b slidably housed in the cylinder body 52a, a hydraulic chamber 52c formed to be surrounded by the cylinder body 52a and the piston 52b with a hydraulic oil filled therein, and a reservoir tank 52d for storing the hydraulic oil. The piston 52b and the clutch pedal 50 are mechanically coupled via the coupling rod 62, and when the clutch pedal 50 is depressed, the piston 52b moves inside the cylinder body 52a in accordance with a stroke amount (operation amount) of the clutch pedal 50. In this case, the connection between the hydraulic chamber 52c and the reservoir tank 52d is interrupted, and a hydraulic pressure is generated in the hydraulic chamber 52c in accordance with the depression force on the clutch pedal 50.

The clutch cylinder 54 is made up of a cylindrical cylinder body 54a, a disc-shaped piston 54b housed slidably in the cylinder body 54a, a hydraulic chamber 54c formed to be surrounded by the cylinder body 54a and the piston 54b with a hydraulic oil filled therein, and a rod 54d coupled to the piston 54b. A tip of the rod 54d is in contact with one end of the release fork 58 formed into an elongated shape.

The release fork 58 is configured to be rotatable around a supporting portion 58a thereof and has one end in a longitudinal direction thereof in contact with the tip of the rod 54d and the other end in contact with a flange portion 36a formed on the release bearing 36. As a result, when the piston 54b of the clutch cylinder 54 moves in the cylinder body 54a due to the hydraulic pressure of the hydraulic oil in the hydraulic chamber 54c, the rod 54d moves in an interlocking manner, so that the one end of the release fork 58 in contact with the tip of the rod 54d is moved. Since this causes the release fork 58 to pivot around the supporting portion 58a, the position of the other end of the release fork 58 is changed, and the release bearing 36 in contact with the other end of the release fork 58 is moved. Therefore, the release fork 58 is pivoted in accordance with the operation amount of the clutch cylinder 54, i.e., movement amounts of the piston 54b and the rod 54d, and the connection/disconnection state of the clutch 16 is thereby switched.

Figure 2:
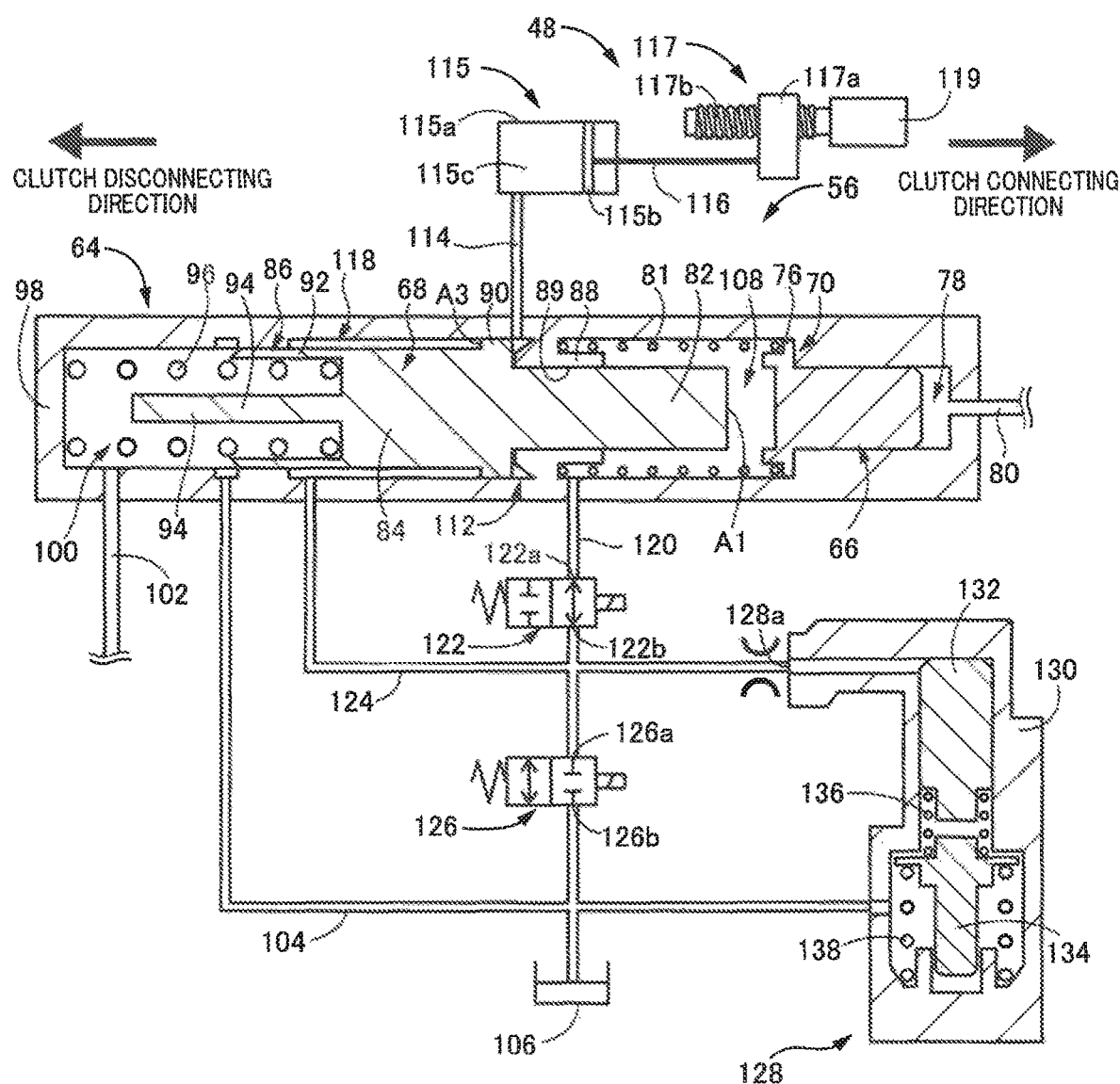
FIG. 2 is an enlarged view of the cylinder device of FIG. 1, showing a state of a cylinder device during normal running.

The cylinder device 56 constituting the depression force transmission mechanism 60 will be described. The cylinder device 56 constitutes a transmission path of the depression force between the master cylinder 52 and the clutch cylinder 54, and the depression force on the clutch pedal 50 is transmitted through the master cylinder 52. FIG. 2 is an enlarged view of the cylinder device 56 of FIG. 1. FIG. 2 shows a state in which the depression of the clutch pedal 50 is released so that the clutch 16 is connected. The cylinder device 56 is configured to include a cylindrical cylinder body 64 and a pair of an input piston 66 and the output piston 68 housed in the cylinder body 64. The input piston 66 and the output piston 68 are both disposed slidably on an inner wall surface of the cylinder body 64.

The inner wall surface of the cylinder body 64 has a stepped portion 70 and diameters of inner wall surfaces at both sides of the stepped portion 70 are differentiated, and the input piston 66 formed into a columnar shape is slidably fitted into the inner wall surface formed to have relatively small diameter from the stepped portion 70. The input piston 66 is provided with a flange portion 76 projecting radially outward on the side facing the output piston 68. An outer circumferential surface of the flange portion 76 is in sliding contact with the inner wall surface of the cylinder body 64 formed to have relatively large diameter. The flange portion 76 is formed to come into contact with a wall surface formed by the stepped portion 70 and perpendicular to a movement direction of the input piston 66. When the flange portion 76 comes into contact with the wall surface formed by the stepped portion 70, the movement of the input piston 66 in the direction away from the output piston 68 is restricted.

FIG. 2 shows a state in which the flange portion 76 is in contact with the wall surface of the stepped portion 70. While the flange portion 76 of the input piston 66 is in contact with the wall surface of the stepped portion 70 as shown in FIG. 2, the clutch 16 is in the connected state. Therefore, the position of the input piston 66 with the flange portion 76 coming into contact with the wall surface of stepped portion 70 is a clutch connecting position of the input piston 66, and the direction of the input piston 66 approaching the wall surface of the stepped portion 70 (rightward direction on the plane of FIG. 2) is a clutch connecting direction. On the other hand, when the flange portion 76 of the input piston 66 moves away from the wall surface of the stepped portion 70, the clutch 16 is disconnected. Therefore, the direction of the flange portion 76 of the input piston 66 away from the wall surface of the stepped portion 70 (leftward direction on the plane of FIG. 2) is a clutch disconnecting direction.

An input-side oil chamber 78 is formed as a space surrounded by the cylinder body 64 and the input piston 66 on the clutch connecting direction side of the input piston 66. The input-side oil chamber 78 is connected via a connecting pipe 80 to the hydraulic chamber 52c of the master cylinder 52. Therefore, when the clutch pedal 50 is depressed and a hydraulic pressure is generated in the hydraulic chamber 52c of the master cylinder 52, the hydraulic pressure is transmitted via the connecting pipe 80 to the input-side oil chamber 78. Therefore, the depression force from the clutch pedal 50 is input via the master cylinder 52 to the input piston 66. The input piston 66 is pressed by the hydraulic pressure transmitted to the input-side oil chamber 78, and the input piston 66 is thereby moved in the clutch disconnecting direction. The input piston 66 is constantly urged in the clutch connecting direction by a spring 81 housed in a first oil chamber 108. Therefore, while the clutch pedal 50 is not depressed, the input piston 66 is moved to the clutch connecting position by urging force of the spring 81.

The output piston 68 is disposed on the clutch disconnecting direction side relative to the input piston 66 in the cylinder body 64. The output piston 68 is made up of a first columnar portion 82 formed into a column shape and facing the input piston 66, a second columnar portion 84 formed into a column shape and having a larger diameter than the first columnar portion 82, and a spring housing portion 86 housing a spring 96 described later.

The cylinder body 64 is provided with a piston supporting portion 88 projecting radially inward from the inner wall surface and slidably supporting the first columnar portion 82 of the output piston 68 in the movement direction of the output piston 68. The first columnar portion 82 is slidably fitted in a supporting hole 89 formed on an inner circumference of the piston supporting portion 88.

The second columnar portion 84 is coupled to an end portion of the first columnar portion 82 on the clutch disconnecting direction side and is formed larger in diameter than the piston supporting portion 88. At an end portion of the second columnar portion 84 on the clutch connecting direction side, a flange portion 90 is formed and extended radially outward. An outer circumferential surface of the flange portion 90 is in sliding contact with the inner wall surface of the cylinder body 64. The flange portion 90 is formed to be adjacent to the piston supporting portion 88 in the movement direction of the output piston 68 and thereby brought into contact with the piston supporting portion 88. FIG. 2 shows a state in which the flange portion 90 of the output piston 68 is in contact with the piston supporting portion 88. As shown in FIG. 2, when the flange portion 90 comes into contact with the piston supporting portion 88, the movement of the output piston 68 in the clutch connecting direction is restricted. While the flange portion 90 of the output piston 68 is in contact with the piston supporting portion 88, the clutch 16 is in the connected state. Therefore, the position of the output piston 68 with the flange portion 90 coming into contact with the piston supporting portion 88 is a clutch connecting position of the output piston 68. The direction of the flange portion 90 of the output piston 68 coming into contact with the piston supporting portion 88 (rightward direction on the plane of FIG. 2) is the clutch connecting direction, and the direction of the output piston 68 away from the piston supporting portion 88 (leftward direction on the plane of FIG. 2) is the clutch disconnecting direction. Therefore, when the output piston 68 moves in the clutch connecting direction, the clutch 16 is connected, and when the output piston 68 moves in the clutch disconnecting direction, the clutch 16 is disconnected.

The spring housing portion 86 is configured to include a cylinder-shaped cylindrical portion 92 in sliding contact with the inner wall surface of the cylinder body 64, and a column-shaped projecting portion 94 projecting in the clutch disconnecting direction from the center of an end portion of the second column portion 84 on the clutch disconnecting direction side. An annular space is formed between an inner circumference of the cylindrical portion 92 and an outer circumference of the projecting portion 94, and the spring 96 is housed in this space. The spring 96 has one end in contact with a bottom wall portion 98 of the cylinder body 64 and the other end in contact with the second columnar portion 84 of the output piston 68 and constantly urges the output piston 68 in the clutch connecting direction.

An output-side oil chamber 100 surrounded by the cylinder body 64 and the output piston 68 is thrilled on the clutch disconnecting direction side of the output piston 68. The output-side oil chamber 100 includes the space in which the spring 96 is housed. The output-side oil chamber 100 is filled with the hydraulic oil and is connected via a connecting pipe 102 to the hydraulic chamber 54c of the clutch cylinder 54. Therefore, a hydraulic pressure of the hydraulic oil generated in the output-side oil chamber 100 (hereinafter referred to as clutch operating hydraulic pressure) is transmitted via the connecting pipe 102 to the hydraulic chamber 54c, and the clutch cylinder 54 is actuated by the clutch operating hydraulic pressure transmitted to the hydraulic chamber 54c.

The output-side oil chamber 100 is connected to a reservoir tank 106 via a connecting pipe 104. While the output piston 68 is in the clutch connecting position as shown in FIG. 2, the output-side oil chamber 100 and the reservoir tank 106 are connected via the connecting pipe 104. In this case, the output-side oil chamber 100 is released so that the clutch operating hydraulic pressure is not generated in the output-side oil chamber 100. On the other hand, when the output piston 68 moves in the clutch disconnecting direction, the communication between the output-side oil chamber 100 and the connecting pipe 104 is interrupted by the cylindrical portion 92. In this case, the output-side oil chamber 100 is sealed, and the clutch operating hydraulic pressure is generated in the output-side oil chamber 100 in accordance with the movement of the output piston 68. The generated clutch operating hydraulic pressure is transmitted to the hydraulic chamber 54c of the clutch cylinder 54. Therefore, the output piston 68 has a function of outputting the clutch operating hydraulic pressure to the clutch cylinder 54.

In the cylinder body 64, the first oil chamber 108 filled with the hydraulic oil is formed between the input piston 66 and the output piston 68. The first oil chamber 108 is an oil-tight space surrounded by the cylinder body 64, the input piston 66, and the output piston 68. The input piston 66 and the output piston 68 are set such that even the pistons 66, 68 made closest to each other in the respective movement directions have the first oil chamber 108 always interposed therebetween. The first oil chamber 108 corresponds to a first oil chamber of the present invention.

The spring 81 is disposed in the first oil chamber 108. One end of the spring 81 is in contact with the piston supporting portion 88 and the other end is in contact with the flange portion 76 of the input piston 66. The spring 81 constantly urges the input piston 66 in the clutch connecting direction, i.e., in the direction in which the depression of the clutch pedal 50 is released.

In the cylinder body 64, a second oil chamber 112 constituting the actuator 48 is formed between the flange portion 90 of the output piston 68 and the piston supporting portion 88. The actuator 48 includes an electric motor 119, a screw transmission device 117 converting a rotational motion of the electric motor 119 into a linear motion, a piston control cylinder 115 (hereinafter referred to as a control cylinder 115) driven by the screw transmission device 117, and the second oil chamber 112 disposed adjacent to the output piston 68 and supplied with the hydraulic oil for pressing the output piston 68 in the clutch disconnecting direction. The second oil chamber 112 corresponds to a control oil chamber of the present invention, and the control cylinder 115 corresponds to a hydraulic cylinder of the present invention.

The second oil chamber 112 is an annular space surrounded by the inner wall surface of the cylinder body 64, the output piston 68, and the piston supporting portion 88 and is filled with the hydraulic oil inside. When the hydraulic oil is supplied to the second oil chamber 112, the output piston 68 is pressed by the hydraulic pressure of the hydraulic oil in the second oil chamber 112 and is moved in the clutch disconnecting direction.

The second oil chamber 112 is connected via a connecting pipe 114 to a hydraulic chamber 115c of the control cylinder 115. Therefore, the second oil chamber 112 is formed such that the hydraulic oil output from the control cylinder 115 can be received. The control cylinder 115 is configured to include a cylindrical cylinder body 115a, a disc-shaped piston 115b slidably housed in the cylinder body 115a, the hydraulic chamber 115c formed to be surrounded by the cylinder body 115a and the piston 115b with the hydraulic oil filled therein, and a reservoir tank not shown. The piston 115b is connected via a rod 116 to a nut member 117a of the screw transmission device 117.

The screw transmission device 117 is made up of the nut member 117a coupled to the rod 116, and a screw shaft 117b fitted with the nut member 117a. The screw shaft 117b is rotationally driven by the electric motor 119 coupled to one end thereof. When the electric motor 119 rotates, the screw shaft 117b also rotates, and the nut member 117a is moved in an axial direction of the screw shaft 117b. Since the nut member 117a is coupled via the rod 116 to the piston 115b of the control cylinder 115, the piston 115b is moved in the axial direction of the screw shaft 117b in conjunction with the nut member 117a. When the piston 115b is moved, the output piston 68 is moved via the hydraulic oil in the hydraulic chamber 115c, the connecting pipe 114, and the second oil chamber 112. Therefore, by controlling a rotation position of the electric motor 119 based on the stroke amount of the clutch pedal 50 during a transition period of depression of the clutch pedal 50, by-wire control can be provided to connect and disconnect the clutch 16 at an appropriate timing via the actuator 48 and the cylinder device 56. Even while the clutch pedal 50 is not depressed, the actuator 48 can be driven to automatically disconnect the clutch 16.

A third oil chamber 118 is formed on the clutch disconnecting direction side of the flange portion 90 of the output piston 68. The third oil chamber 118 is a cylindrical space surrounded by the inner wall surface of the cylinder body 64, an outer circumferential surface of the second columnar portion 84 of the output piston 68, and the flange portion 90, and is filled with the hydraulic oil inside. The hydraulic pressure of the hydraulic oil supplied to the third oil chamber 118 presses the output piston 68 in the clutch connecting direction. The third oil chamber 118 corresponds to a second oil chamber of the present invention.

The first oil chamber 108 is connected to one end of a connecting pipe 120. The other end of the connecting pipe 120 is connected to a first port 122a of a first electromagnetic switching valve 122. The first electromagnetic switching valve 122 is a switching valve switching a communication state concerning communicated or interrupted between the first port 122a and a second port 122b, and the communication state is switched based on a command signal Sv1 (i.e., a command current) output from an electronic control device 150 described later. When the first electromagnetic switching valve 122 is opened, the first port 122a and the second port 122b communicate with each other, and the connecting pipe 120 and a connecting pipe 124 are connected. On the other hand, when the first electromagnetic switching valve 122 is closed, the communication between the first port 122a and the second port 122b is interrupted, and the first oil chamber 108 is sealed in an oil-tight manner. The first electromagnetic switching valve 122 corresponds to an electromagnetic valve of the present invention.

The first electromagnetic switching valve 122 is a so-called normally closed type valve allowing the communication between the first port 122a and the second port 122b when the valve 122 is energized (when a current is supplied) and interrupting the communication between the first port 122a and the second port 122b when not energized (when a current is not supplied). Therefore, when the first electromagnetic switching valve 122 is not energized, the valve 122 is closed so that the first oil chamber 108 is sealed in an oil-tight manner, and when the first electromagnetic switching valve 122 is energized, the valve 122 is opened. The first electromagnetic switching valve 122 is a well-known technique and therefore will not be described in detail in terms of structure and operation.

The second port 122b of the first electromagnetic switching valve 122 is connected to the connecting pipe 124. The connecting pipe 124 connects the third oil chamber 118, a first port 126a of a second electromagnetic switching valve 126 described later, and an input port 128a of the pedal effort simulator 128. Therefore, when the first electromagnetic switching valve 122 is opened, the first oil chamber 108, the third oil chamber 118, and the input port 128a of the pedal effort simulator 128 are connected to each other via the connecting pipes 120, 124. In this way, the first electromagnetic switching valve 122 is disposed such that the valve 122 can connect and disconnect the first oil chamber 108, the third oil chamber 118, and the pedal effort simulator 128.

The second electromagnetic switching valve 126 is a switching valve switching a communication state concerning communicated or interrupted between the first port 126a and a second port 126b, and the communication state is switched based on a command signal Sv2 (i.e., a command current) output from the electronic control device 150. The second port 126b of the second electromagnetic switching valve 126 is connected to the connecting pipe 104. Therefore, when the second electromagnetic switching valve 126 is opened, the first port 126a and the second port 126b communicate with each other, and the connecting pipe 124 and the connecting pipe 104 are connected. On the other hand, when the second electromagnetic switching valve 126 is closed, the communication between the first port 126a and the second port 126b is interrupted. The second electromagnetic switching valve 126 is a so-called normally open type valve allowing the communication between the first port 126a and the second port 126b when the valve 126 is not energized and interrupting the communication between the first port 126a and the second port 126b when energized. Therefore, when the valve 126 is not energized, the connecting pipe 124 and the connecting pipe 104 are connected, and when the valve 126 is energized, the connecting pipe 124 and the connecting pipe 104 are disconnected. The second electromagnetic switching valve 126 is a well-known technique and therefore will not be described in detail in terms of structure and operation. The second electromagnetic switching valve 126 corresponds to a second electromagnetic valve of the present invention.

The pedal effort simulator 128 is connected to the connecting pipe 124 and is disposed to generate a pedal reaction force in the transition period of depression of the clutch pedal 50 in a simulated manner. By using, as an input, the hydraulic oil flowing into the pedal effort simulator 128 due to movement of the input piston 66 in a state in which the first electromagnetic switching valve 122 is opened and the second electromagnetic switching valve 126 is closed, the pedal effort simulator 128 can generate a hydraulic pressure with this hydraulic oil in accordance with the stroke amount of the clutch pedal 50.

The pedal effort simulator 128 is configured to include a tubular casing 130, a first piston 132 and a second piston 134 housed in the casing 130, a first spring 136 interposed between the first piston 132 and the second piston 134, and a second spring 138 urging the second piston 134 toward the first piston 132. The stiffness of the first spring 136 is made smaller than the stiffness of the second spring 138.

When the input piston 66 is moved in the clutch disconnecting direction while the first electromagnetic switching valve 122 is opened and the second electromagnetic switching valve 126 is closed, the hydraulic oil flows through the connecting pipe 120 and the connecting pipe 124 into the casing 130 from the input port 128a of the pedal effort simulator 128. Since the first piston 132 is pressed by the hydraulic oil toward the second piston 134, the first piston 132 moves toward the second piston 134. This elastically deforms the first spring 136, so that a hydraulic pressure is generated in accordance with an elastic return force of the first spring 136 in the pedal effort simulator 128. This hydraulic pressure is transmitted to the first oil chamber 108 and is further transmitted via the input piston 66, the master cylinder 52, etc. to the clutch pedal 50 as the pedal reaction force of the clutch pedal 50.

Furthermore, when the force pressing the first piston 132 becomes larger than elastic return force of the second spring 138 as the input piston 66 moves toward the clutch disconnecting direction side, the second spring 138 is also elastically deformed. This brings the first spring 136 and the second spring 138 into a seriesly connected state, and the first spring 136 and the second spring 138 are reduced in spring stiffness as a whole. Therefore, when the stroke amount (operation amount) of the clutch pedal 50 exceeds a predetermined value, an increasing gradient of the hydraulic pressure generated in the pedal effort simulator 128 becomes gentle, and an increasing gradient of the pedal reaction force of the clutch pedal 50 also becomes gentle. By appropriately adjusting the stiffness of the first spring 136 and the second spring 138, the pedal reaction force conforming to the stroke amount of the clutch pedal 50 can be generated in the pedal effort simulator 128. Since elastic return force of the spring 81 housed in the first oil chamber 108 also contributes as the pedal reaction force, the elastic return force of the spring 81 is also taken into consideration when the stiffnesses of the first spring 136 and the second spring 138 are adjusted during designing.

A pressure receiving area A1 of the output piston 68 on the first oil chamber 108 side is made equal to a pressure receiving area A3 of the output piston 68 on the third oil chamber 118 side. The pressure receiving area A1 on the first oil chamber 108 side corresponds to an area of a circle when the tip of the first columnar portion 82 of the output piston 68 is viewed from the side of the input piston 66. The pressure receiving area A3 on the third oil chamber 118 side corresponds to an area of a portion formed into a ring shape when the flange portion 90 of the output piston 68 is viewed from the side of the output-side oil chamber 100.

When the pressure receiving area A1 and the pressure receiving area A3 are made equal as described above, change amounts of the hydraulic oil in the first oil chamber 108 and the third oil chamber 118 associated with the movement of the output piston 68 become equal while the first electromagnetic switching valve 122 is opened and the second electromagnetic switching valve 126 is closed, and therefore, the amount of the hydraulic oil flowing into the pedal effort simulator 128 due to the movement of the output piston 68 does not change. Therefore, the pedal effort simulator 128 is not affected by the movement of the output piston 68. Additionally, since the hydraulic pressure of the hydraulic oil in the first oil chamber 108 is equal to the hydraulic pressure of the hydraulic oil in the third oil chamber 118, a pressing force in the clutch disconnecting direction applied from the first oil chamber 108 of the output piston 68 is offset by a pressing force in the clutch connecting direction applied from the third oil chamber 118 of the output piston 68, so that the forces applied to the output piston 68 from the first oil chamber 108 and the third oil chamber 118 become zero as a whole. Therefore, it is not necessary to consider the forces applied from the first oil chamber 108 and the third oil chamber 118 during a transition period of movement of the output piston 68.

Returning to FIG. 1, the electric motor 119, the first electromagnetic switching valve 122, and the second electromagnetic switching valve 126 are operated based on command signals (command current) output from the electronic control device 150. The electronic control device 150 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to control the electric motor 119, the first electromagnetic switching valve 122, and the second electromagnetic switching valve 126. The electronic control device 150 may be disposed integrally with an electronic control device controlling the engine 12 etc. or may be disposed separately as a control device exclusively controlling the electric motor 119, the first electromagnetic switching valve 122, and the second electromagnetic switching valve 126.

Signals input to the electronic control device 150 include a signal indicative of a stroke amount STm of the master cylinder 52 detected by a stroke sensor 72 and a signal indicative of a stroke amount STc of the clutch cylinder 54 detected by a stroke sensor 74. Since the master cylinder 52 interlocks with the clutch pedal 50 and the input piston 66, the stroke amount STm of the master cylinder 52 can be read as the stroke amount of the clutch pedal 50 and a stroke amount of the input piston 66. Since the clutch cylinder 54 interlocks with the release bearing 36 and the output piston 68, the stroke amount STc of the clutch cylinder 54 can be read as a stroke amount of the release bearing 36 and the stroke amount of the output piston 68.

The electronic control device 150 outputs a command signal Sc for controlling the electric motor 119, the command signal Sv1 for switching the opening and closing of the first electromagnetic switching valve 122, and the command signal Sv2 for switching the opening and closing of the second electromagnetic switching valve 126.

The electronic control device 150 functionally includes an operation control portion 152 for controlling the electric motor 119, the first electromagnetic switching valve 122, and the second electromagnetic switching valve 126 to control an operating state of the connecting/disconnecting device 10, and a failure time control portion 154 providing a fail-safe control when a system failure is detected. Control functions of the operation control portion 152 and the failure time control portion 154 will hereinafter be described.

First, description will be made of the control function of the operation control portion 152 during normal running in which the clutch 16 is connected and disconnected in accordance with the operations of the clutch pedal 50 by the driver. During normal running, the operation control portion 152 outputs the command signal Sv1 for opening the first electromagnetic switching valve 122 and outputs the command signal Sv2 for closing the second electromagnetic switching valve 126. As a result, since the first electromagnetic switching valve 122 is opened, the first oil chamber 108, the third oil chamber 118, and the pedal effort simulator 128 are connected to each other. Additionally, since the second electromagnetic switching valve 126 is closed, the connecting pipe 124 and the connecting pipe 104 are disconnected. In this state, the operation control portion 152 provides the by-wire control in which the electric motor 119 is driven in accordance with the stroke amount of the clutch pedal 50 to connect and disconnect the clutch 16.

The operation control portion 152 has, for example, a relationship map between the stroke amount STm of the master cylinder 52 corresponding to the stroke amount of the clutch pedal 50 and a target stroke amount STc* of the clutch cylinder 54 preliminarily stored therein, and applies the relationship map to the stroke amount STm of the master cylinder 52 detected at any time so as to calculate the target stroke amount STc* of the clutch cylinder 54. Subsequently, the operation control portion 152 controls the electric motor 119 such that the actual stroke amount STc of the clutch cylinder 54 becomes equal to the calculated target stroke amount STc*. For example, feedback control is provided by the operation control portion 152 to control the electric motor 119 based on a deviation between the target stroke amount STc* and the actual stroke amount STc. As a result, the actual stroke amount STc follows the target stroke amount STc* of the clutch cylinder 54, so that the clutch cylinder 54 properly operates in accordance with the stroke amount STm of the master cylinder 52 (i.e., the stroke amount of the clutch pedal 50).

The pedal reaction force acting on the clutch pedal 50 during the transition period of depression of the clutch pedal 50 is generated by the pedal effort simulator 128, and therefore, even though the clutch pedal 50 and the clutch 16 are not mechanically connected, the same operation feeling can be obtained as with a connecting/disconnecting device having a conventional structure in which the clutch pedal 50 and the clutch 16 are mechanically connected.

During the transition period of depression of the clutch pedal 50 (i.e., a transition period of movement of the input piston 66), the actuator 48 moves the output piston 68 in the clutch disconnecting direction. Since the pressure receiving area A1 of the output piston 68 on the first oil chamber 108 side is equal to the pressure receiving area A3 of the output piston 68 on the third oil chamber 118 side, the change amounts of the hydraulic oil in the first oil chamber 108 and the third oil chamber 118 are equal during the transition period of movement of the output piston 68. Therefore, since the amount of the hydraulic oil flowing into the pedal effort simulator 128 due to the movement of the output piston 68 does not change, the pedal effort simulator 128 is prevented from being affected due to the movement of the output piston 68. As a result, the pedal reaction force associated with the operation of the clutch pedal 50 becomes equal to the reaction force from the hydraulic pressure generated by the pedal effort simulator 128 due to the movement of the input piston 66 and the reaction force generated by the spring 81. This enables the by-wire control in which the actuator 48 is driven in accordance with the stroke amount of the clutch pedal 50 while an appropriate pedal reaction force is obtained from the pedal effort simulator 128 and the spring 81 during the transition period of operation of the clutch pedal 50.

Figure 3:
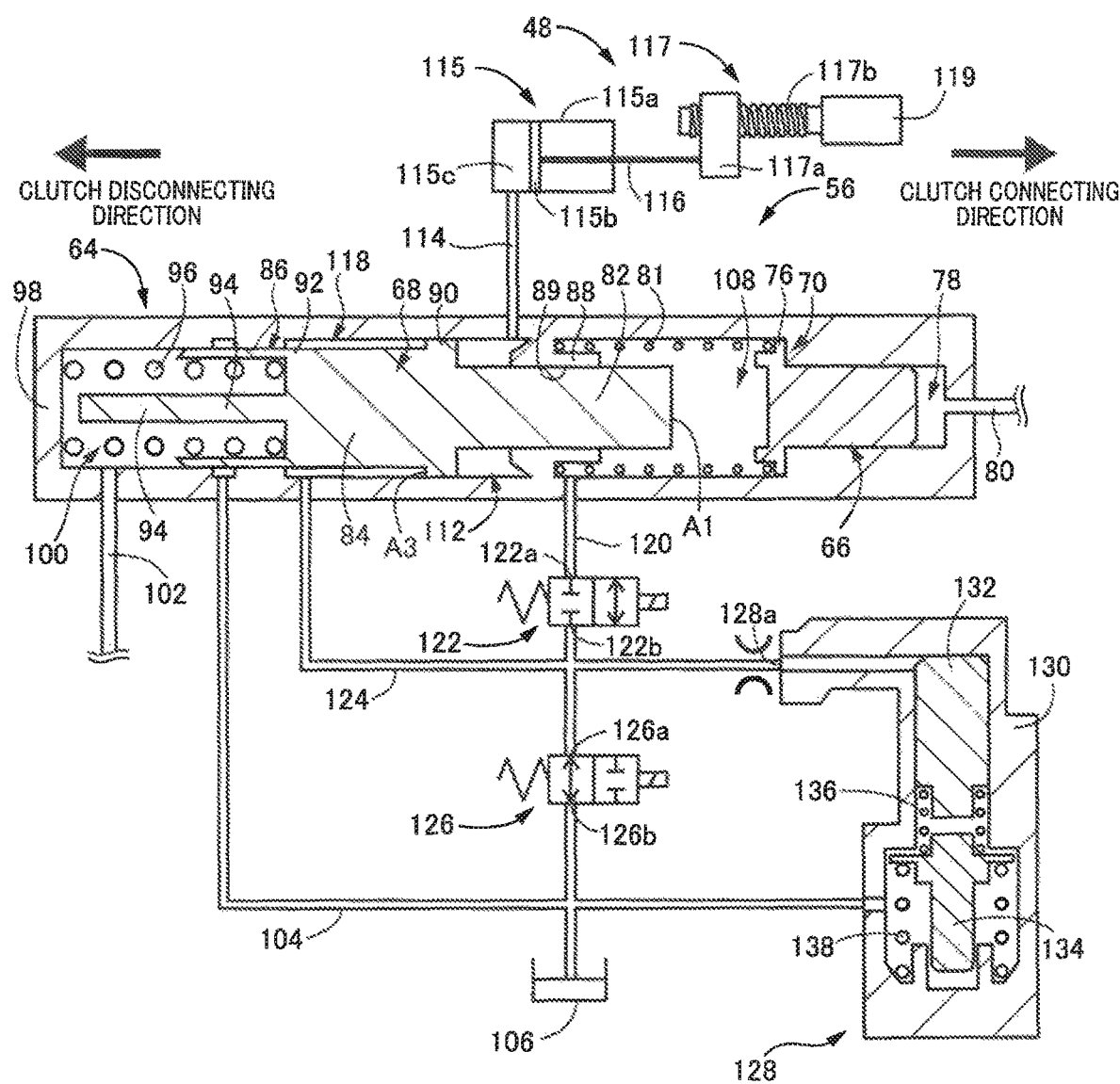
FIG. 3 is an enlarged view of the cylinder device of FIG. 1, showing a state where an output piston is retained by a hydraulic oil in a first oil chamber.

When the clutch pedal 50 is depressed to a disconnecting position of the clutch 16 and the output piston 68 moves to a disconnecting position of the clutch 16, the clutch 16 is disconnected. In this case, for example, if the vehicle is stopped for waiting for a traffic light etc., the first electromagnetic switching valve 122 is closed by the operation control portion 152. When the first electromagnetic switching valve 122 is closed, the first oil chamber 108 is brought into a sealed state, and therefore, as shown in FIG. 3, the output piston 68 is retained at the disconnecting position of the clutch 16 by the hydraulic oil of the first oil chamber 108, which eliminates the need for retaining the output piston 68 with power of the electric motor 119 at the disconnecting position of the clutch 16. Thus, electric power consumption can be reduced by stopping power supply to the electric motor 119.

If a condition for enabling coasting running is satisfied during running, the operation control portion 152 drives the actuator 48 to move the output piston 68 to the clutch disconnecting position and disconnect the clutch 16. When the condition for enabling coasting running is satisfied, the operation control portion 152 outputs the command signal Sv1 for opening the first electromagnetic switching valve 122 and outputs the command signal Sv2 for closing the second electromagnetic switching valve 126. As a result, since the first electromagnetic switching valve 122 is opened, the first oil chamber 108 and the third oil chamber 118 are connected via the connecting pipe 124. Additionally, since the pressure receiving area A1 of the output piston 68 on the first oil chamber 108 side is equal to the pressure receiving area A3 of the output piston 68 on the third oil chamber 118 side, the change amounts of the hydraulic oil in the first oil chamber 108 and the third oil chamber 118 are equal, and a hydraulic pressure is prevented from being generated in the pedal effort simulator 128. After opening the first electromagnetic switching valve 122, the operation control portion 152 drives the actuator 48 to move the output piston 68 to the clutch disconnecting position and disconnect the clutch 16. Since the clutch 16 is disconnected during coasting running, the power transmission path between the engine 12 and the manual transmission 14 is interrupted, which eliminates a running resistance due to drag of the engine 12. This allows the vehicle to perform coasting running for a longer distance, so that fuel consumption can be improved. The condition for enabling coasting running is satisfied, for example, when multiple conditions such as a vehicle speed equal to or greater than a predetermined vehicle speed and an accelerator opening degree less than a predetermined value are satisfied, and if at least any one of the multiple conditions is no longer satisfied, the condition for enabling coasting running is not satisfied.

When the output piston 68 is moved to the clutch disconnecting position by the actuator 48, the first electromagnetic switching valve 122 is closed by the operation control portion 152. As shown in FIG. 3, the first oil chamber 108 is sealed by closing the first electromagnetic switching valve 122, and the output piston 68 is retained by the hydraulic oil of the first oil chamber 108. Therefore, it is not necessary to retain the output piston 68 with the power of the electric motor 119 at the clutch disconnecting position, and the electric power consumption can be reduced by stopping the power supply to the electric motor 119. When the condition for enabling coasting running is no longer satisfied, the first electromagnetic switching valve 122 is opened by the operation control portion 152, so that the output piston 68 is moved to the connecting position of the clutch 16 by urging three of the spring 96.

The operation at the occurrence of an abnormality in the system controlling the connecting/disconnecting device 10 will be described. The failure time control portion 154 constantly determines whether an abnormality has occurred in the system of the connecting/disconnecting device 10 during running. The failure time control portion 154 determines that a system abnormality has occurred, for example, if a signal indicative of the stroke amount STm of the master cylinder 52 or the stroke amount STc of the clutch cylinder 54 is not output or the stroke amount STm, STc based on the signal falls outside a normal range. The failure time control portion 154 also determines that a system abnormality has occurred, for example, if the stroke amount STc of the clutch cylinder 54 related to the stroke amount of the output piston 68 does not change even though the command signal Sc for driving the electric motor 119 is output. The system abnormality determination is not limited thereto and, for example, a self-check function of the electronic control device 150 etc. may be applied as appropriate.

Figure 4:
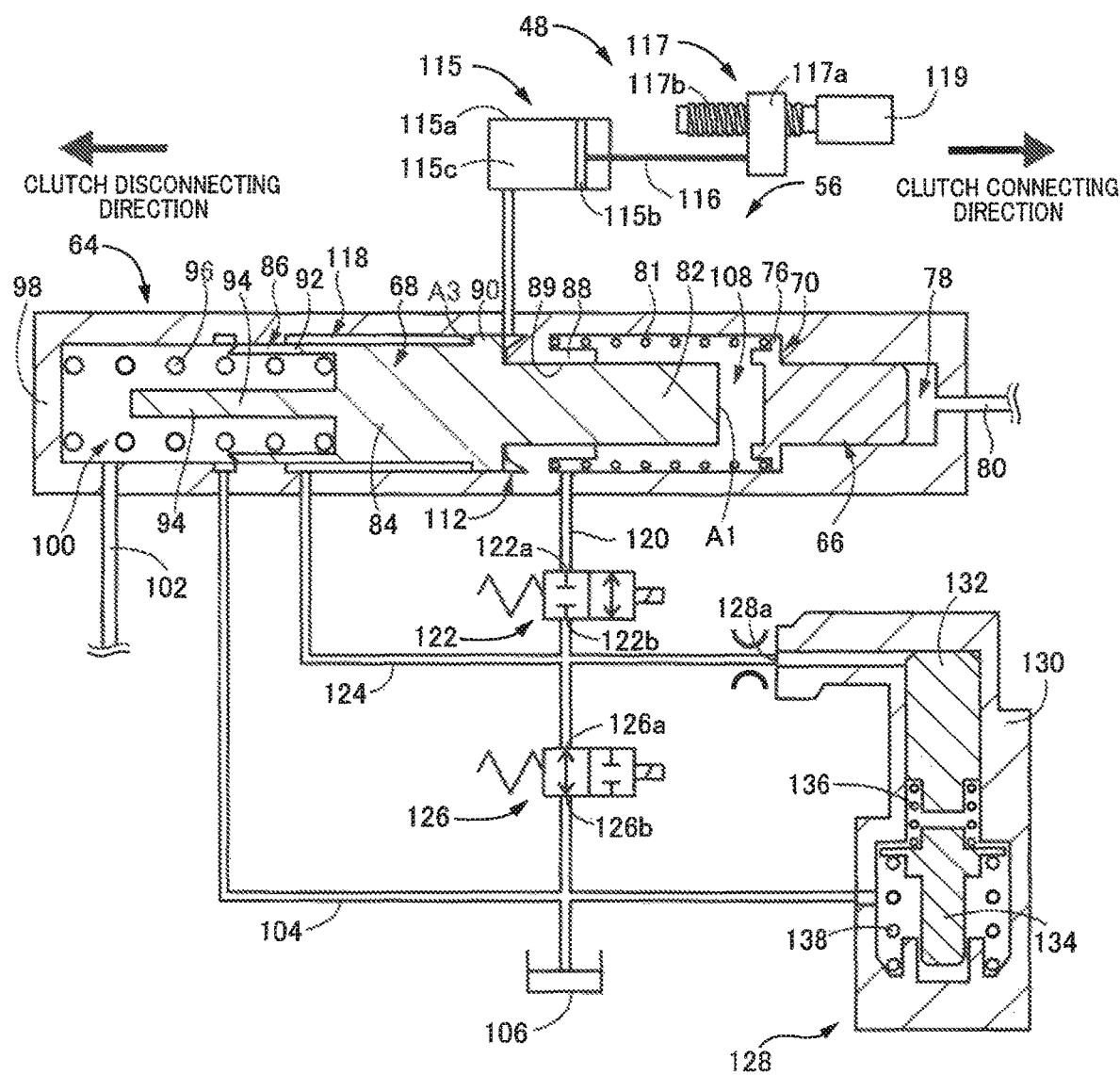
FIG. 4 is an enlarged view of the cylinder device of FIG. 1, showing a state where the energization of a first electromagnetic switching valve and a second electromagnetic switching valve is interrupted.

When the failure time control portion 154 determines that a system abnormality has occurred, the failure time control portion 154 interrupts the energization of the first electromagnetic switching valve 122 and the second electromagnetic switching valve 126 to close the first electromagnetic switching valve 122 and open the second electromagnetic switching valve 126. FIG. 4 shows the state when the energization of the first electromagnetic switching valve 122 and the second electromagnetic switching valve 126 is interrupted. Since the first electromagnetic switching valve 122 is a normally closed type valve, the first electromagnetic switching valve 122 is closed when the energization to the first electromagnetic switching valve 122 is interrupted. Therefore, since the first oil chamber 108 is sealed in an oil-tight manner, the output piston 68 is retained by the hydraulic oil of the first oil chamber 108, so that a sudden engagement of the clutch 16 is prevented. Additionally, since the first oil chamber 108 is sealed in an oil-tight manner, the depression force on the clutch pedal 50 can be transmitted to the output piston 68 via the hydraulic oil of the first oil chamber 108, and direct operation of the clutch 16 can be performed with the clutch pedal 50. Therefore, even if an abnormality occurs in the system, running of the vehicle can be continued.

Since the second electromagnetic switching valve 126 is a normally open type valve, the second electromagnetic switching valve 126 is opened when the energization to the second electromagnetic switching valve 126 is interrupted. Since the connecting pipe 124 is connected via the second electromagnetic switching valve 126 and the connecting pipe 104 to the reservoir tank 106, the input port 128a of the pedal effort simulator 128 and the reservoir tank 106 are connected by opening the second electromagnetic switching valve 126, so that the hydraulic pressure of the pedal effort simulator 128 is released. Therefore, since the hydraulic pressure is not generated in the pedal effort simulator 128, it is prevented that the hydraulic pressure generated in the pedal effort simulator 128 is transmitted to the third oil chamber 118, the output piston 68 is urged in the clutch connecting direction, and consequently, the pedal reaction force of the clutch pedal 50 is increased.

If a system abnormality occurs in which no electric power is supplied to the system controlling the connecting/disconnecting device 10, the energization of the first electromagnetic switching valve 122 and the second electromagnetic switching valve is also interrupted. In this case, since the first electromagnetic switching valve 122 is a normally closed type valve and the second electromagnetic switching valve 126 is a normally open type valve, the first electromagnetic switching valve 122 is closed and the second electromagnetic switching valve 126 is opened, so that the direct operation of the clutch 16 can be performed with the clutch pedal 50.

As described above, according to this example, the connection/disconnection state between the first oil chamber 108 and the third oil chamber 118 is switched by the first electromagnetic switching valve 122 to enable the by-wire control in which the actuator 48 is operated in accordance with the stroke amount (operation amount) of the clutch pedal 50 to connect and disconnect the clutch 16, and if a system failure has occurred, the direct operation of the clutch 16 can be performed such that the depression force on the clutch pedal 50 is directly transmitted to the output piston 68. For example, the by-wire control is provided while the first electromagnetic switching valve 122 is opened. In this case, although the first oil chamber 108 and the third oil chamber 118 are connected, the pressure receiving area A1 of the output piston 68 on the first oil chamber 108 side is equal to the pressure receiving area A3 of the output piston 68 on the third oil chamber 118 side, the change amounts of the hydraulic oil in the first oil chamber 108 and the third oil chamber 118 are equal when the output piston 68 moves, and the pressing force applied from the first oil chamber 108 side of the output piston 68 becomes equal to the pressing force applied from the third oil chamber 118 side of the output piston 68. Therefore, the pressing force applied from the first oil chamber 108 side of the output piston 68 is offset by the pressing force applied from the third oil chamber 118 side of the output piston 68, and it is not necessary to consider the pressing forces applied from the first oil chamber 108 side and the third oil chamber 118 side during the transition period of movement of the output piston 68.

If a system failure has occurred, the first electromagnetic switching valve 122 is closed to seal the first oil chamber 108, and the output piston 68 is retained by the hydraulic oil of the first oil chamber 108, so that the sudden engagement of the clutch 16 is prevented. In this regard, a self-lock mechanism for preventing the sudden engagement of the clutch 16 is no longer necessary, and a load applied to the actuator 48 is reduced. Furthermore, since the first oil chamber 108 is sealed, power can be transmitted between the input piston 66 and the output piston 68 via the hydraulic oil of the first oil chamber 108, and therefore, the clutch 16 can directly be operated through depression of the clutch pedal 50, so that the running of the vehicle can be continued.

According to this example, when the output piston 68 is moved to the disconnecting position of the clutch 16 by the actuator 48, the first electromagnetic switching valve 122 is closed, so the first oil chamber 108 is sealed and the output piston 68 is retained by the hydraulic oil of the first oil chamber 108. Therefore, it is not necessary to retain the output piston 68 at the disconnecting position of the clutch 16 by the actuator 48, and the actuator 48 can be stopped.

Another example of the present invention will be described. In the following description, portions common to the examples are denoted by the same reference numerals and will not be described.

Second Example

Figure 5:
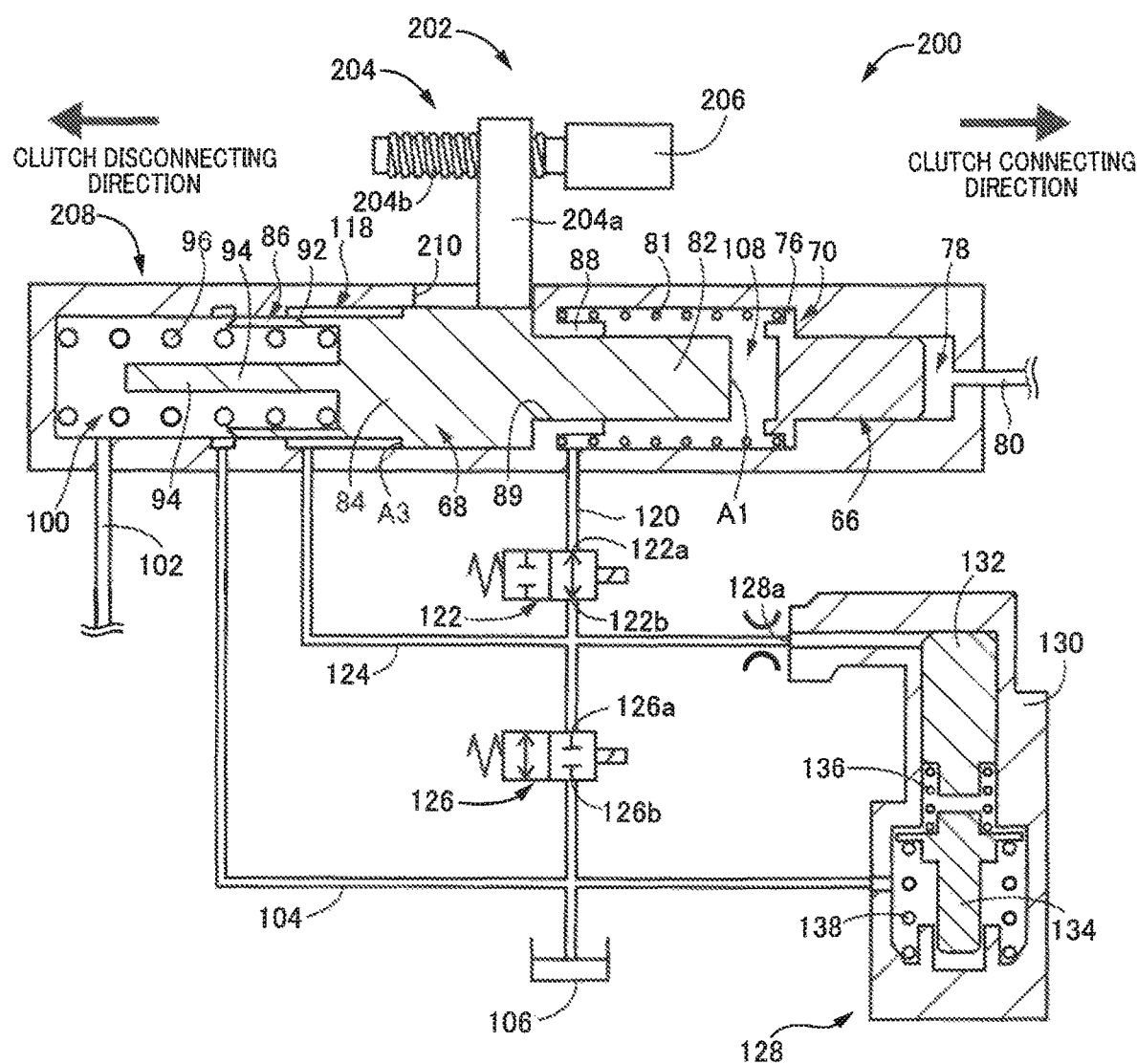
FIG. 5 is a view showing a configuration of a cylinder device corresponding to another example of the present invention.

FIG. 5 is a view showing a configuration of a cylinder device 200 corresponding to another example of the present invention. In this example, an actuator 202 connected to the output piston 68 in a power transmittable manner is made up of a screw transmission device 204 and an electric motor 206. The structure of the actuator 202 of this example will hereinafter be described. The configuration of the cylinder device 200 other than the actuator 202 is basically the same as the example described above and therefore will not be described.

The actuator 202 is configured to include the screw transmission device 204 for converting a rotational motion of the electric motor 206 into a linear motion of a nut member 204 of the screw transmission device 204, and the electric motor 206 applying a rotation torque to the screw transmission device 204.

The screw transmission device 204 is configured to include the nut member 204a connected to the output piston 68, and a screw shaft 204b fitted with the nut member 204a. One end of the screw shaft 204b is connected to the electric motor 206. Therefore, when the electric motor 206 rotates, the screw shaft 204b also integrally rotates with the electric motor 206.

A cylinder body 208 constituting the cylinder device 200 is formed into a cylindrical shape, and an opening 210 allowing communication between the inside and the outside of the cylinder body 208 is formed on the cylinder body 208. The nut member 204a is connected to the output piston 68 through the opening 210. Therefore, the screw transmission device 204 is connected to the output piston 68 in a power transmittable manner. The nut member 204a is movable in a gap of the cylinder body 208 formed by the opening 210.

Since the nut member 204a of the screw transmission device 204 is connected to the output piston 68 as described above, the rotational motion of the electric motor 206 is converted into the linear motion of the nut member 204a in an axial direction of the screw shaft 204b, so that the output piston 68 can be moved by the electric motor 206. Additionally, the size of the opening 210 is set to a value allowing the output piston 68 to move between the clutch connecting position and the clutch disconnecting position. Therefore, by controlling the electric motor 206, the output piston 68 can be moved between the clutch connecting position and the clutch disconnecting position. The specific operation of the actuator 202 is basically the same as the actuator 48 of the example described above and therefore will not be described.

Even when the actuator 202 is made up of the screw transmission device 204 and the electric motor 206 and has a structure in which the output piston 68 is moved without a hydraulic cylinder as in this example, the same effect as the example described above can be obtained. Additionally, since the hydraulic cylinder and an oil. Chamber as the second oil chamber 112 of the example described above are not required, the structure of the cylinder device 200 is simplified.

Although the examples of the present invention have been described in detail with reference to the drawings, the present invention is also applied in other forms.

For example, in the examples described above, the actuator 48 moves the output piston 68 by the hydraulic pressure of the hydraulic oil generated by the control cylinder 115 and supplied to the second oil chamber 112; however, the present invention is not limited thereto as long as the actuator can move the output piston 68. For example, an electromagnetic pressure regulating valve may be disposed to control the hydraulic pressure of the second oil chamber 112 by using as a source pressure a hydraulic pressure of a hydraulic oil discharged from an oil pump driven by the engine 12 etc., and the output piston 68 may be moved by controlling the hydraulic pressure of the second oil chamber 112 with the pressure regulating valve. Alternatively, the output piston 68 may be moved by the hydraulic oil discharged from an electric oil pump. In short, any actuator enabled to move the output piston 68 may appropriately be applied.

In the examples described above, the screw transmission device 117, 204 is made up of the nut member 117a, 204a and the screw shaft 117b, 204b; however, any mechanism converting a rotational motion into a linear motion may appropriately be applied as the screw transmission device. For example, the screw transmission device may be made up of a ball screw or a worm gear.

In the examples described above, the master cylinder 52 is disposed between the cylinder device 56, 200 and the clutch pedal 50; however, the input piston 66 may directly be moved by the clutch pedal 50, The cylinder device 56, 200 and the master cylinder 52 may be integrated.

In the examples described above, the first electromagnetic switching valve 122 is a normally closed type valve closed in a non-energized state, and the second electromagnetic switching valve 126 is a normally open type valve opened in a non-energized state; however, the present invention is not limited thereto. Therefore, the first electromagnetic switching valve 122 may be a normally open type valve, or the second electromagnetic switching valve 126 may be a normally closed type valve.

In the examples described above, the stroke sensor 72 detects the stroke amount STm of the master cylinder 52; however, since the master cylinder 52 interlocks with the clutch pedal 50 and the input piston 66, the stroke amount of the clutch pedal 50 or the input piston 66 may be detected instead of the stroke amount STm of the master cylinder 52. The stroke sensor 74 detects the stroke amount STc of the clutch cylinder 54; however, since the clutch cylinder 54 interlocks with the output piston 68, the stroke amount of the output piston 68 may be detected instead of the stroke amount STc of the clutch cylinder 54.

The above description is merely an embodiment and the present invention can be implemented in variously modified and improved forms based on the knowledge of those skilled in the art.

REFERENCE SIGNS LIST

10: connecting/disconnecting device
16: clutch
48, 202: actuator
50: clutch pedal
54: clutch cylinder
56, 200: cylinder device
60: depression three transmission mechanism
66: input piston
68: output piston
106: reservoir tank
108: first oil chamber
112: second oil chamber (control oil chamber)
115: control cylinder (hydraulic cylinder)
117, 204: screw transmission device
118: third oil chamber (second oil chamber)
119, 206: electric motor
122: first electromagnetic switching valve (electromagnetic valve)
122: connecting pipe
126: second electromagnetic switching valve (second electromagnetic valve)
128: pedal effort simulator

What is claimed is:

1. A clutch connecting/disconnecting device comprising: a clutch pedal operated by a driver; a clutch cylinder to which a depression force from the clutch pedal is transmitted; a depression force transmission mechanism transmitting the depression force from the clutch pedal to the clutch cylinder; and an actuator connected to the depression force transmission mechanism in a power transmitting manner and connecting and disconnecting a clutch via the depression force transmission mechanism, wherein
the depression force transmission mechanism is configured to include a cylinder device to which the depression force from the clutch pedal is transmitted, wherein the cylinder device includes
an input piston to which the depression force from the clutch pedal is input,
an output piston for outputting a clutch operating hydraulic pressure to the clutch cylinder,
a first oil chamber formed between the input piston and the output piston, and
a second oil chamber supplied with a hydraulic oil for pressing the output piston with a hydraulic pressure of the hydraulic oil in a connecting direction of the clutch, wherein
a pressure receiving area on the first oil chamber side of the output piston is made equal to a pressure receiving area on the second oil chamber side of the output piston, wherein
the first oil chamber and the second oil chamber are connected via an electromagnetic valve connecting and disconnecting between the first oil chamber and the second oil chamber, and wherein
the actuator is connected to the output piston in a power transmitting manner.

2. The clutch connecting/disconnecting device according to claim 1, wherein
the electromagnetic valve is closed when an abnormality occurs in at least one of an electronic control device controlling the connecting/disconnecting device and the connecting/disconnecting device.

3. The clutch connecting/disconnecting device according to claim 1, wherein
the electromagnetic valve is closed when the output piston is moved to a disconnecting position of the clutch by the actuator.

4. The clutch connecting/disconnecting device according to claim 1, wherein
a pedal effort simulator is connected to a connecting pipe connecting the second oil chamber and the electromagnetic valve.

5. The clutch connecting/disconnecting device according to claim 4, wherein the connecting pipe is connected via a second electromagnetic valve to a reservoir tank.

6. The clutch connecting/disconnecting device according to claim 1, wherein
the actuator is configured to include an electric motor, a screw transmission device converting a rotational motion of the electric motor into a linear motion, a hydraulic cylinder driven by the screw transmission device, and a control oil chamber formed at a position adjacent to the output piston and supplied with a hydraulic oil for pressing the output piston in a disconnecting direction of the clutch, and wherein
the control oil chamber is formed to receive the hydraulic oil output from the hydraulic cylinder.

7. The clutch connecting/disconnecting device according to claim 1, wherein
the actuator is configured to include an electric motor and a screw transmission device converting a rotational motion of the electric motor into a linear motion, and wherein
the screw transmission device is connected to the output piston in a power transmitting manner.

8. The clutch connecting/disconnecting device according to claim 1, wherein the electromagnetic valve is a normally closed type valve.

* * * * *